US007586280B2

(12) United States Patent
Warren et al.

(10) Patent No.: US 7,586,280 B2
(45) **Date of Patent: *Sep. 8, 2009**

(54) SYSTEM AND METHOD FOR ESTABLISHING A REFERENCE ANGLE FOR CONTROLLING A VEHICLE ROTATIONAL CLOSURE SYSTEM

(75) Inventors: Gary Warren, Aurora (CA); Steven Steane, Courtice (CA); Reginald Grills, Oshawa (CA); Thomas Frommer, Mount Albert (CA); Darren Van Roon, Bowmanville (CA)

(73) Assignee: Flextronics Automotive Inc., Ontario (CA)

( * ) Notice: Subject to any disclaimer, the term of this patent is extended or adjusted under 35 U.S.C. 154(b) by 90 days.

This patent is subject to a terminal disclaimer.

(21) Appl. No.: 11/898,124

(22) Filed: Sep. 10, 2007

(65) Prior Publication Data

US 2008/0061719 A1 Mar. 13, 2008

Related U.S. Application Data

(63) Continuation-in-part of application No. 11/471,563, filed on Jun. 21, 2006.

(51) Int. Cl.
*G05D 3/00* (2006.01)

(52) U.S. Cl. ....................... 318/466; 318/266; 318/280; 439/73; 439/79

(58) Field of Classification Search ................. 318/266, 318/466; 324/664, 754; 33/391; 439/66, 439/71, 73; 73/204.26; 280/727
See application file for complete search history.

(56) References Cited

U.S. PATENT DOCUMENTS

| | | | | |
|---|---|---|---|---|
| 4,755,146 | A * | 7/1988 | Rishworth et al. | 439/71 |
| 4,775,831 | A * | 10/1988 | Annamalai | 324/664 |
| 5,395,251 | A * | 3/1995 | Rodriguez et al. | 439/66 |
| 5,463,324 | A * | 10/1995 | Wardwell et al. | 324/754 |
| 5,692,911 | A * | 12/1997 | Webster et al. | 439/67 |
| 5,866,818 | A * | 2/1999 | Sumi et al. | 73/514.33 |
| 6,231,391 | B1 | 5/2001 | Ramey et al. | |
| 6,398,252 | B1 * | 6/2002 | Ishikawa et al. | 280/727 |
| 6,776,634 | B2 | 8/2004 | Besier et al. | |
| 6,798,794 | B2 * | 9/2004 | Miyahara | 372/9 |

(Continued)

OTHER PUBLICATIONS

PCT Notification of Transmittal of The International Search Report and the Written Opinion of the International Searching Authority, or the Declaration (Jun. 20, 2009); (PCT/IB2008/002333).

*Primary Examiner*—Paul Ip
(74) *Attorney, Agent, or Firm*—Patton Boggs LLP

(57) ABSTRACT

A control module for controlling a rotational closure system of a vehicle. The control module may include a printed circuit board having an electronic circuit disposed thereon. The electronic circuit may be used to control a rotational closure system of the vehicle. A header may be connected to the printed circuit board. The header may include a top side and a bottom side having a relative, non-zero degree angle formed therebetween. Pins may extend from the bottom of the header to form an electrical connection with the electronic circuit on the printed circuit board. An angle sensor may be positioned on the top side of the header and be electrically connected to the pins of the header to communicate with the electronic circuit. The angle sensor may generate an angle signal for the electronic circuit to use in positioning the rotational closure system.

32 Claims, 13 Drawing Sheets

U.S. PATENT DOCUMENTS 6,888,120 B2 * 5/2005 Chiasson et al. ......... 250/203.4
6,994,569 B2 * 2/2006 Minich et al. ................. 439/79
7,040,925 B2 * 5/2006 Beerwerth et al. ..... 439/620.02
7,101,224 B2 * 9/2006 Dattilo et al. ............... 439/608
7,118,391 B2 * 10/2006 Minich et al. ................. 439/79
7,339,657 B2 * 3/2008 Coates ........................ 356/73
7,373,816 B2 * 5/2008 Strohrmann et al. ..... 73/204.26
7,374,431 B2 * 5/2008 Su .............................. 439/73
7,383,637 B2 * 6/2008 Ikuta ........................... 33/391
2004/0070355 A1 4/2004 Ogura
2006/0028058 A1 2/2006 Jung
2007/0299588 A1 * 12/2007 Warren et al. ................. 701/49
2008/0007191 A1 * 1/2008 Chinsen et al. ............. 318/280

* cited by examiner

SYSTEM AND METHOD FOR ESTABLISHING A REFERENCE ANGLE FOR CONTROLLING A VEHICLE ROTATIONAL CLOSURE SYSTEM

RELATED APPLICATIONS

This application is a continuation-in-part of co-pending U.S. patent application Ser. No. 11/471,563 filed on Jun. 21, 2006, the entire teachings of which are incorporated herein by reference.

BACKGROUND OF THE INVENTION

Vehicles have become more and more automated to accommodate the desires of consumers. Vehicle parts, including windows, sun roofs, seats, sliding doors, and lift gates (e.g., rear latches and trunks) have been automated to enable users to press a button on the vehicle or on a remote control to automatically open, close, or otherwise move the vehicle parts.

While these vehicle parts may be automatically controlled, the safety of consumers and objects is vital. An obstacle, such as a body part or physical object, that obstructs a vehicle part while closing could be damaged or crushed, or the vehicle part or drive mechanism could be damaged, if the obstacle is not detected while the vehicle part is moving.

In the case of detecting obstacles in the path of an automatic lift gate or other closure system, one conventional technique for speed control and sensing an obstacle has been to use Hall Effect sensors or optical vane interrupt sensors. The Hall Effect sensors or optical vane interrupt sensors are positioned in a motor or on a mechanical drive train. Sensor signals are generated by the rotation of the motor giving velocity to the drive mechanism. The sensor signals can be used to detect a change in velocity and to allow for speed control and obstacle detection. This sensing technique is generally known as an indirect sensing technique.

One problem with the use of Hall Effect sensors and optical vane interrupt sensors is a result of mechanical backlash due to system flex and unloaded drive mechanism conditions. As an example, when a lift gate is closing, the gate reaches a point where the weight of the lift gate begins to close the lift gate without any additional effort from the drive mechanism. In fact, at this point, the drive mechanism applies effort to the lift gate to prevent premature closing. This is a state when negative energy is imparted from the drive mechanism to the lift gate. In order to detect an obstacle at this point, the drive mechanism must transition from a negative energy state to a positive energy state. Once the transition to the positive energy state occurs, a controller of the drive mechanism can then detect a change in the velocity of the drive mechanism, thus detecting a collision with an obstacle. The controller may then signal the motor to change direction. The obstacle detection process may take hundreds of milliseconds to complete, which is too long to detect a sudden movement of the lift gate and long enough to cause injury to a person or damage to an object, vehicle part, or drive mechanism. As a result, obstacle detection is very difficult at the end of travel when sensitivity to obstacles should be the highest to avoid damaging obstacles or damaging the vehicle part.

A problem that exists with rotational closure systems is determining specific angles at which the system (e.g., lift gate) is positioned. Still yet, because each rotational closure system is different, designers of controllers for these systems have to design different controllers for each and often struggle with sensor mountings and configurations to determine the angular position of the rotational closure system. Accordingly, there is a need to minimize the problems of the controllers and sensor mountings and configurations.

SUMMARY OF THE INVENTION

To provide for improved speed control and obstacle protection of a rotational closure system, such as a lift gate, of a vehicle, the principles of the present invention provide for a direct sensing technique. The direct sensing technique senses an absolute position of the rotational closure system rather than sensing a motor or drive mechanism. A controller may be positioned on the rotational closure system. A common controller having a configurable angle sensor unit to accommodate different mounting angles of the controller to the rotational closure system may be used. One embodiment may include a control module for controlling a rotational closure system of a vehicle. The control module may include a printed circuit board having an electronic circuit disposed thereon. The electronic circuit may be used to control a rotational closure system of the vehicle. A header may be connected to the printed circuit board. The header may include a top side and a bottom side having a relative, non-zero degree angle formed therebetween. Pins may extend from the bottom of the header to form an electrical connection with the electronic circuit on the printed circuit board. An angle sensor may be positioned on the top side of the header and be electrically connected to the pins of the header to communicate with the electronic circuit. The angle sensor may generate an angle signal for the electronic circuit to use in positioning the rotational closure system.

Another embodiment may include a vehicle that includes a body and a rotational closure system rotatably coupled to the body. A controller may be coupled to the rotational closure system, where the controller includes (i) a printed circuit board positioned at a first angle relative to a longitudinal axis of a vehicle, and (ii) an angle sensor mounted to the printed circuit board and positioned at a second angle relative to the longitudinal axis.

Another embodiment may include a method for controlling a rotational closure system of the vehicle. The method may include sensing an angle the rotational closure system of the vehicle, where the angle is sensed from a predetermined offset angle relative to a longitudinal axis of a vehicle. A drive signal may be generated and a drive mechanism may be driven with the drive signal to output a mechanical force for moving the rotational closure system. An angle signal based on the sensed angle of the rotational closure system may be generated. The angle signal may be fed back and, in response to the feedback angle signal, the drive signal may be altered while the drive mechanism is moving the rotational closure system between the open and closed positions.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Direct measurement differs from indirect measurement in that direct measurement of a rotational closure system is derived from monitoring a signal that is produced by a sensor attached directly to the rotational closure system (e.g., lift gate) of the vehicle. The sensor may feed back a signal directly to a controller used to control the position and velocity of the lift gate and perform obstacle detection. The controller may further utilize the feedback signal to provide for increased obstacle detection sensitivity.

Moreover, direct measurement creates an intelligent system that knows the position of the rotational closure system being sensed regardless of the circumstances. Unlike the indirect incremental measurement that needs to establish its location at the beginning of operation, the direct measurement technique creates knowledge of the rotational closure system location before, during, and after a move operation. This is accomplished by establishing an absolute position with respect to the sensor outputs. As a result, the direct measurement technique provides increased sensitivity at the end of travel of the rotational closure system when closing and reduces wear and tear on a system. The direct measurement technique further provides the system with the foresight of knowing a final position of the rotational closure system prior to actual movement.

Figure 1A:
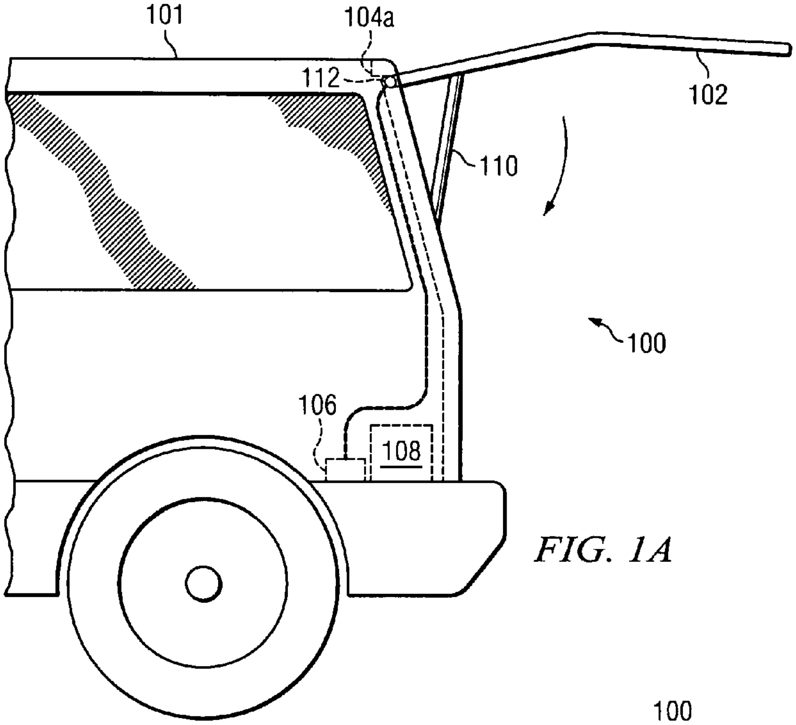
FIG. 1A is an illustration showing a side view of a backend of a vehicle with a lift gate in an open position.

FIG. 1A is an illustration showing a side view of a backend of a vehicle 100 with a lift gate 102 in an open position. The vehicle 100 includes a vehicle body 101 and lift gate 102 coupled to the vehicle body 101 by a hinge 112. A rotary flex shaft encoder 104*a* may be mounted to the hinge 112. As the lift gate 102 opens, the hinge 112 rotates, thereby causing the encoder 104*a* to rotate and generate a digital pulse or pulsewidth modulation (PWM) signal. In one embodiment, the encoder may be mounted to the vehicle body (e.g., ceiling) of the vehicle 100. Although FIG. 1A shows and describes a lift gate, it should be understood that the principles of the present invention may be applied to any rotational closure system, such as a trunk or lift gate. Reference to the lift gate is for exemplary purposes and constitutes one of many possible embodiments, configurations, and applications in accordance with the principles of the present invention.

A controller 106 may be mounted within the vehicle 100. The encoder 104*a* may be electrically coupled to the controller 106 and signals produced by the encoder in response to the lift gate 102 opening and closing may be communicated to the controller 106. A motor 108, such as a motor 108 or other drive mechanism (e.g., pneumatic pump), which may also be mounted within the vehicle 100, may be electrically coupled to the controller 106. The motor 108 may have contacts (not shown) for being electrically in communication with the controller 106 to receive a drive signal for controlling operation of the motor 108. Although a motor is shown and described in FIG. 1B, it should be understood that the principles of the present invention may be applied to any drive mechanism, such as a hydraulic motor, pneumatic motor, or electro-mechanical motor, as understood in the art. Reference to the motor is for exemplary purposes and constitutes one of many possible embodiments, configurations, and applications in accordance with the principles of the present invention.

A cylinder 110 may be mounted between the vehicle body 101 and lift gate 102. The cylinder 110 may be used to open and close the lift gate 102 by the motor 108 forcing and draining fluid, such as air, for example, into and out of the cylinder 110, as understood in the art.

Figure 1C:
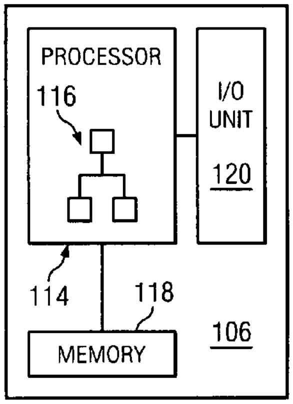
FIG. 1C is a block diagram of an exemplary controller having a processor executing software for driving a rotational closure system in accordance with the principles of the present invention.
Figure 1B:
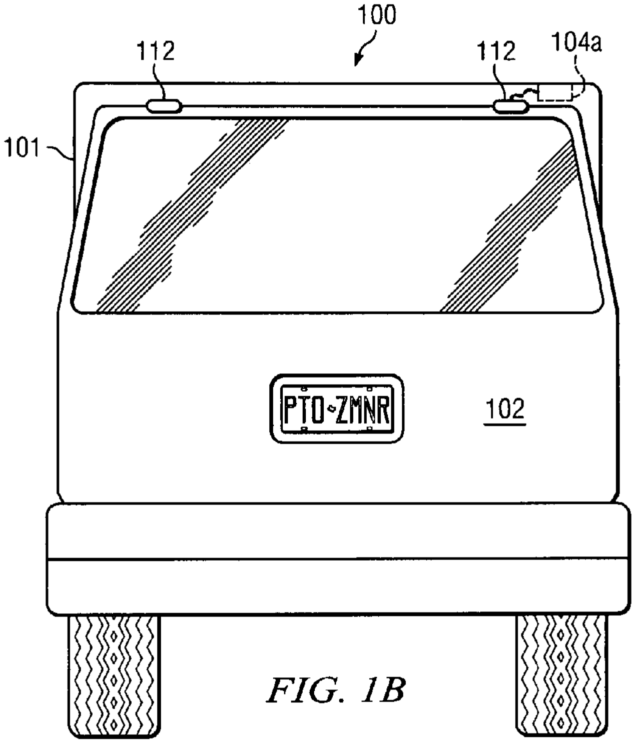
FIG. 1B is an illustration of a rear view of the vehicle.

FIG. 1B is an illustration of a rear view of the vehicle 100. As shown, the encoder 104*a* may be mounted to the vehicle body 101 to sense rotation of the hinge 112 when the lift gate 102 is opened and closed. At least a portion of the encoder 104*a* may be mounted axially with the hinge 112 to be rotated.

FIG. 1C is a block diagram of an exemplary controller 106 having a processor 114 executing software 116. The processor may be in communication with memory 118 for storing information, such as the program 116 and data used by the program, for example, and an input/output (I/O) unit 120. As the encoder 104*a* generates an angle signal having a PWM form, the I/O unit 120 receives the angle signal and communicates it to the processor 114 for processing via the software 116. The angle signal may be a digital PWM signal. In addition, the software 116 generates a drive signal and may generate a compensation signal based on the angle signal to be utilized to alter the drive signal for controlling velocity and sensing obstacles during movement of the lift gate 102 utilizing a position, velocity, acceleration, and/or force controller, as understood in the art. The I/O unit 120 may be part of the processor 114 itself or be separate electronic components configured to drive a motor to drive the lift gate 102 (FIG. 1A) to a desired position.

Figure 2A:
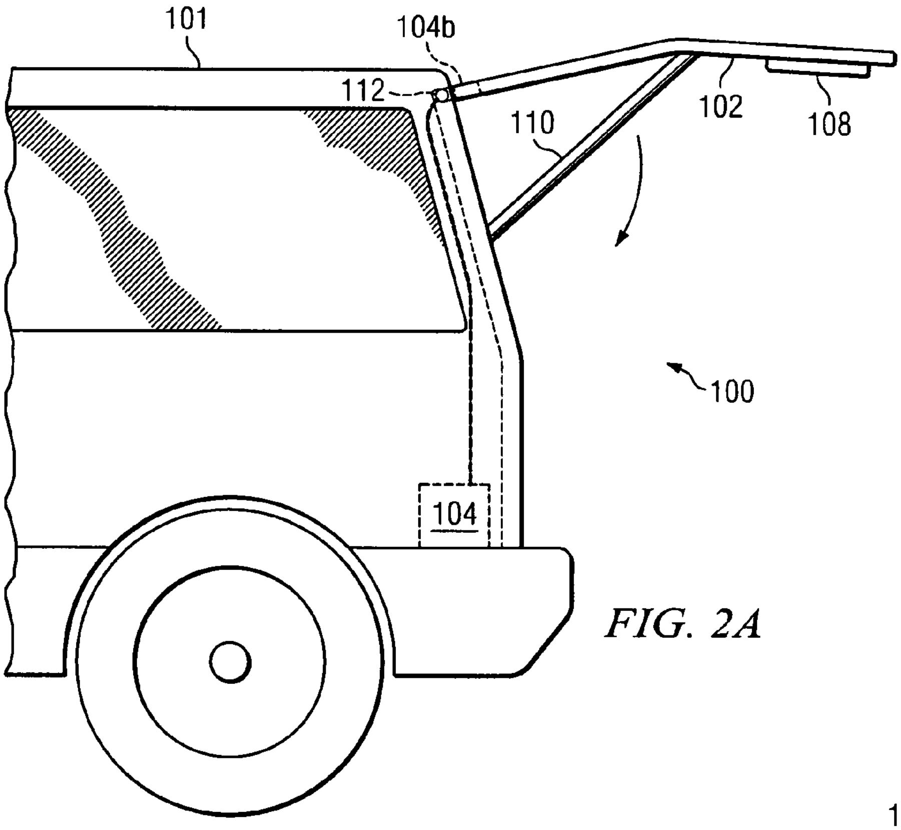
FIG. 2A is an illustration of the vehicle of FIG. 1 configured to control velocity of the rotational closure system and to sense an obstacle obstructing movement of the rotational closure system in accordance with the principles of the present invention.

FIG. 2A is an illustration of the vehicle of FIG. 1A configured to control velocity of a rotational closure system, such as a lift gate 102, and sense an obstacle obstructing movement of the rotational closure system in accordance with the principles of the present invention. Rather than using the encoder 104*a* (FIG. 1A), an analog angle sensor 104*b* may be utilized in accordance with the principles of the present invention. The analog angle sensor 104*b* may be mounted to the rotational closure system away from the hinge 112 (i.e., no portion being in axial alignment with or coupled to the hinge). In addition, the motor 108 may be attached to the rotational closure system. In such a configuration, the controller 104 may be electrically coupled to a drive mechanism, such as the motor 108, by the use of wires (not shown) or wireless communication. As described with regard to FIG. 1C, the control module 106 may drive the motor 108 with a drive signal that may be based on an angle signal produced by the analog angle sensor 104*b*.

Figure 2B:
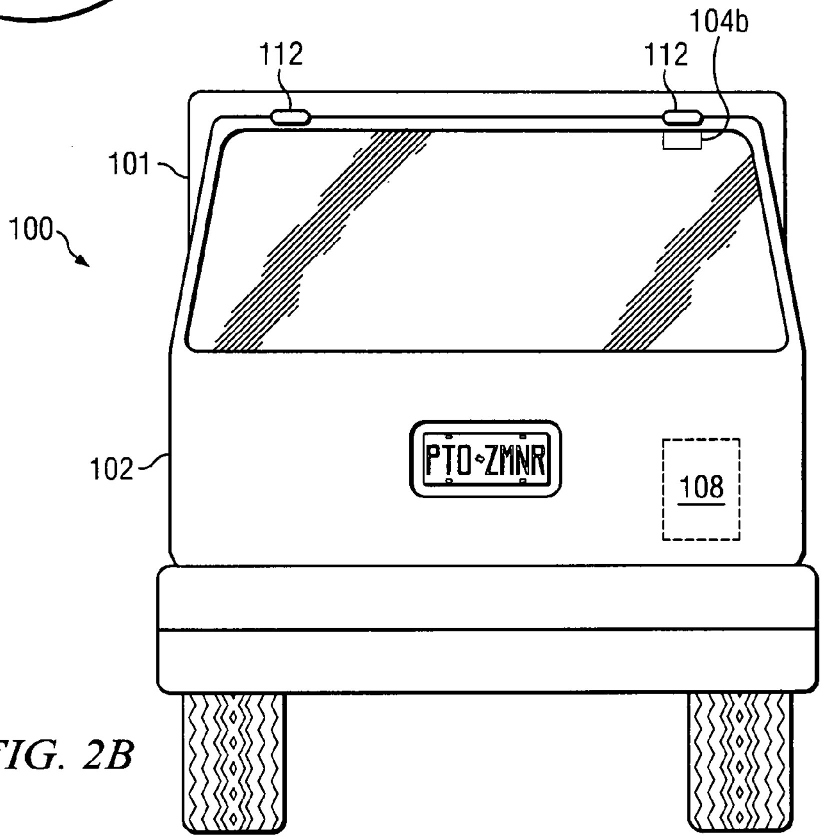
FIG. 2B is an illustration of the vehicle of FIG. 2A.

FIG. 2B is an illustration of the vehicle 100 of FIG. 2A. As shown, the analog angle sensor 104*b* may be coupled to the lift gate 102 away from the hinge 112. It should be understood that the analog angle sensor 104*b* may be positioned anywhere on the lift gate 102 and be oriented in a position relative to the vehicle body 101 such that the control module 106 (FIG. 2A) knows the absolute angle of the lift gate 102.

Figure 3:
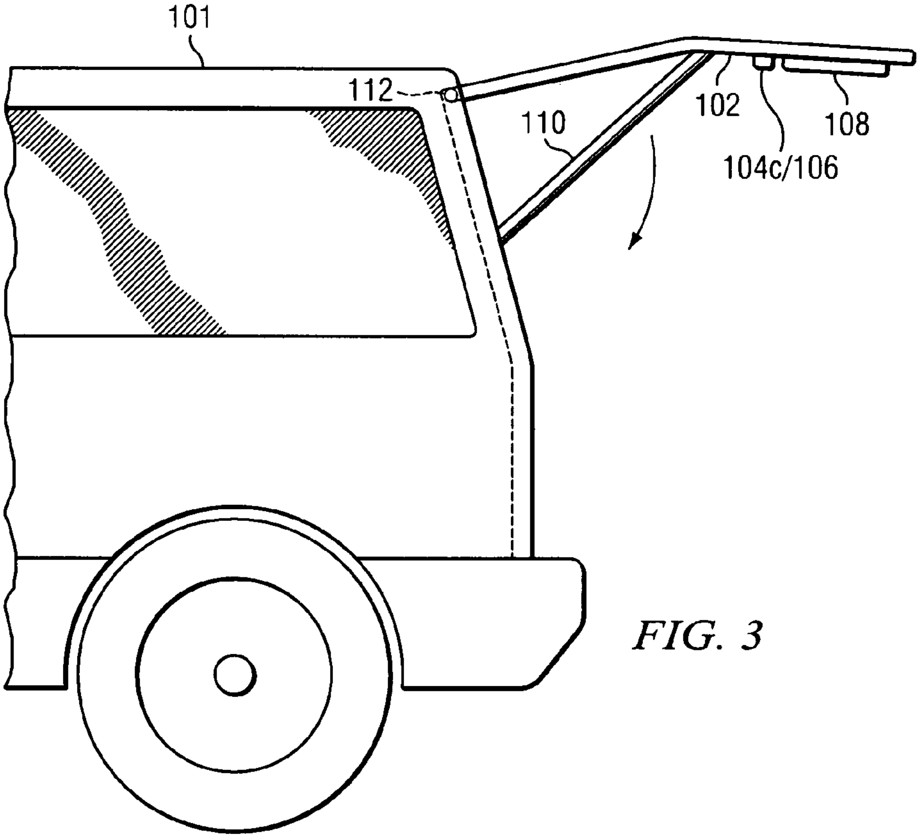
FIG. 3 is an illustration of the vehicle of FIG. 1A having another configuration by controlling velocity and detecting an obstacle in accordance with the principles of the present invention.

FIG. 3 is an illustration of the vehicle 100 of FIG. 1A having another configuration for controlling velocity and detecting an obstacle in accordance with the principles of the present invention. In this configuration, an angle sensor 104*c* may be mounted on a control module 106. The control module 106 may be disposed on (i.e., directly or indirectly coupled to) the lift gate 102. The angle sensor 104*c* may produce an angle signal having a PWM form with a duty cycle corresponding to an angle of the angle sensor 104*c*. As previously described, the control module 106 receives the angle signal having a PWM form from the angle sensor 104*c* and drives the motor 108 with a drive signal adjusted based on the angle signal to control the lift gate 102 while opening and closing.

Figure 4:
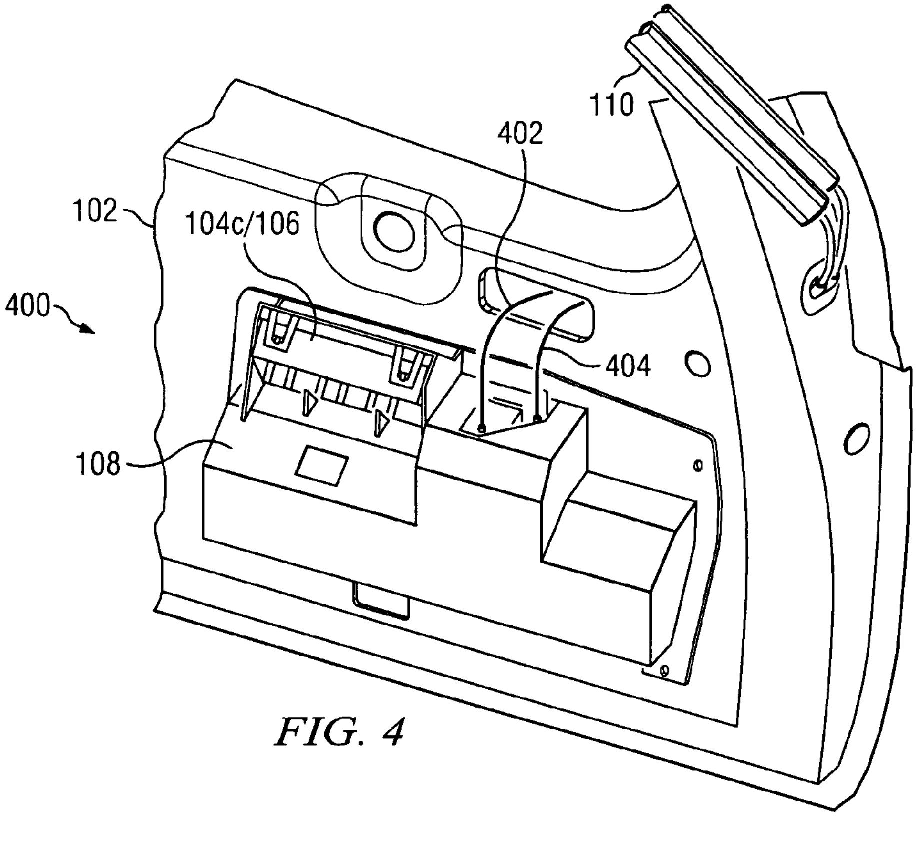
FIG. 4 is an illustration of an inside view of the rotational closure system in accordance with the configuration of FIG. 3.

FIG. 4 is an illustration of an inside view of the lift gate 102 in accordance with the configuration of FIG. 3. As shown, the angle sensor 104*c* and control module 106 are disposed on the lift gate 102. Additionally, the motor 108 (FIG. 1) is coupled to the cylinder 110 via an input line 402 and return line 404 to drive fluid to and from the cylinder for opening and closing the lift gate 402.

Figure 5:
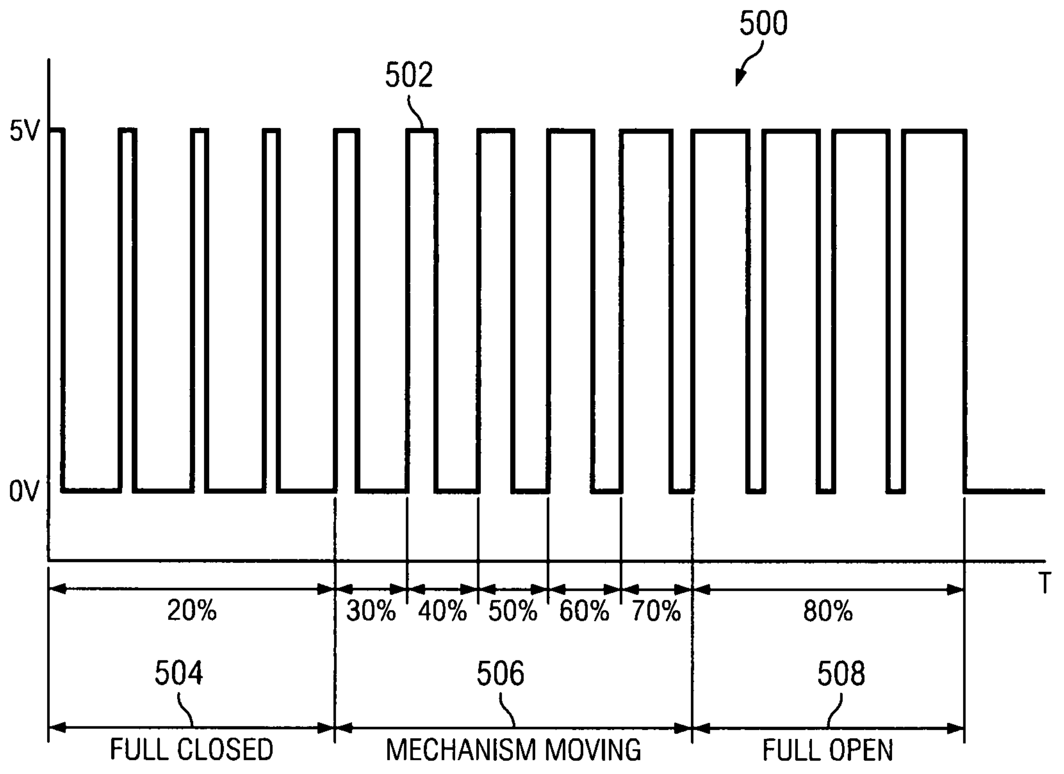
FIG. 5 is a graph showing an exemplary angle signal having a pulsewidth modulation form.

FIG. 5 is a graph showing an exemplary angle signal having a pulsewidth modulation form. An angle signal 502 having a PWM form is shown during three time periods, a full closed time period 504, moving time period 506, and full open time period 508. While a lift gate is in the full close time period 504, a duty cycle (i.e., ratio of on to off time) is 20 percent. When the lift gate transitions between full close to full open during the moving time period 506, the duty cycle increases accordingly. As shown, the duty cycle increases to 30 percent all the way to 80 percent. When the lift gate is in a full open position in the full open time period 508, the duty cycle is at 80 percent. It should be understood that the lift gate may be moved between the open and closed positions without reaching either the full open or full close position in accordance with the principles of the present invention.

Figure 6:
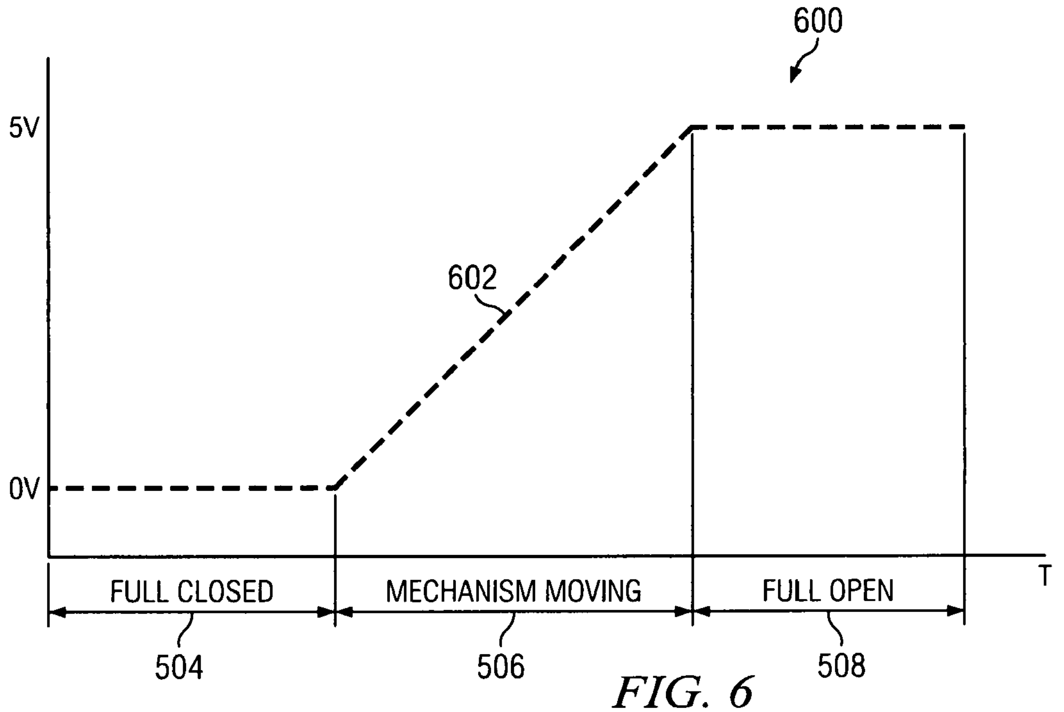
FIG. 6 is a graph showing an exemplary angle signal in an analog form.

FIG. 6 is a graph showing an exemplary angle signal 602 in an analog form. The angle signal 602 is zero volts when a lift gate is in a full closed position at the full closed time period 504 (corresponding with the full closed time period of FIG. 5). During the moving time period 506, the lift gate transitions from the full closed position to a full opened position and the angle signal shows a ramp from about zero volts to about five volts as sensed by an analog sensor (FIG. 2B). However, it should be understood that the voltage range can be configured and often ranges from 0.5 volts to 4.5 volts for diagnostic purposes. At the full open time period 508, the lift gate is the fully open position and the analog signal remains at five volts.

Figure 7:
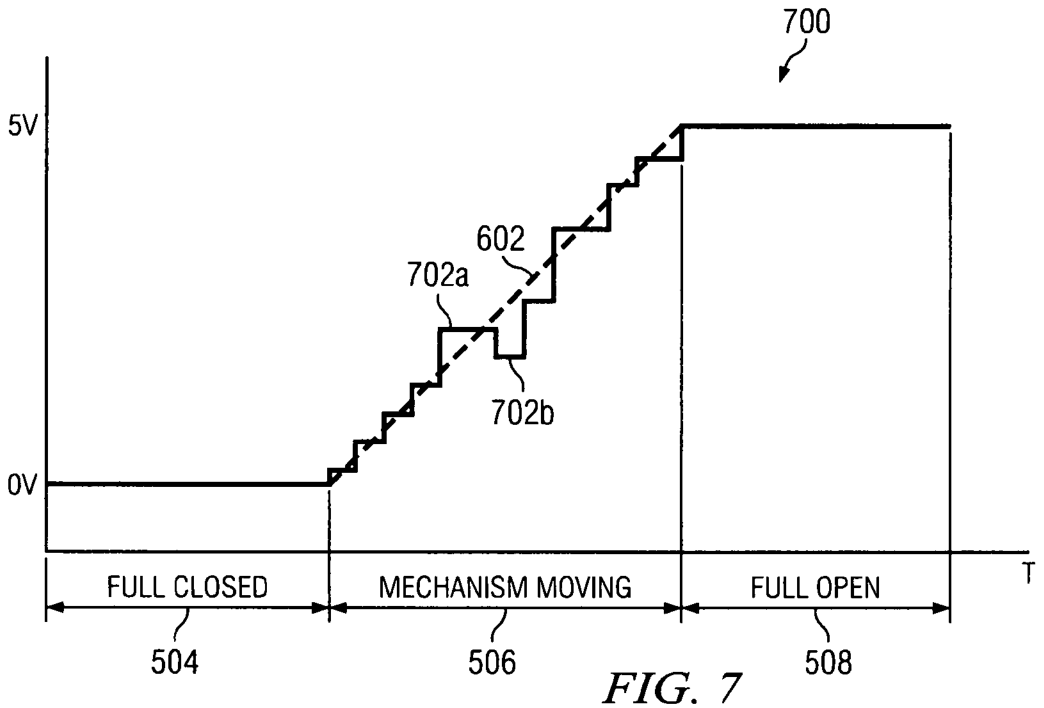
FIG. 7 is a graph showing the angle signal of FIG. 6 with a digitized signal overlay.

FIG. 7 is a graph showing the angle signal of FIG. 6 with a digitized signal overlay. Although an analog sensor can generate a signal that changes as the lift gate changes position as shown in FIG. 6, a controller must utilize an analog-to-digital (A/D) converter to convert the analog signal into a digital signal for a processor to use the angle signal information in controlling speed of the lift gate and perform obstacle detection. However, as shown in FIG. 7, the A/D conversion process demonstrates that an A/D converter may generate two different analog values, but convert them to the same digital value, regardless of how much movement the lift gate actually underwent. Likewise, two separate values 702*a* and 702*b* may be generated from the same analog signal, thus reporting two distinct positions even if the lift gate has not moved. This problem can be addressed by increasing the resolution of a decoder so that it can distinguish between small differences in the analog signal. However, these incorrect decoded digital values may still occur, but they may be less frequent.

Figure 8:
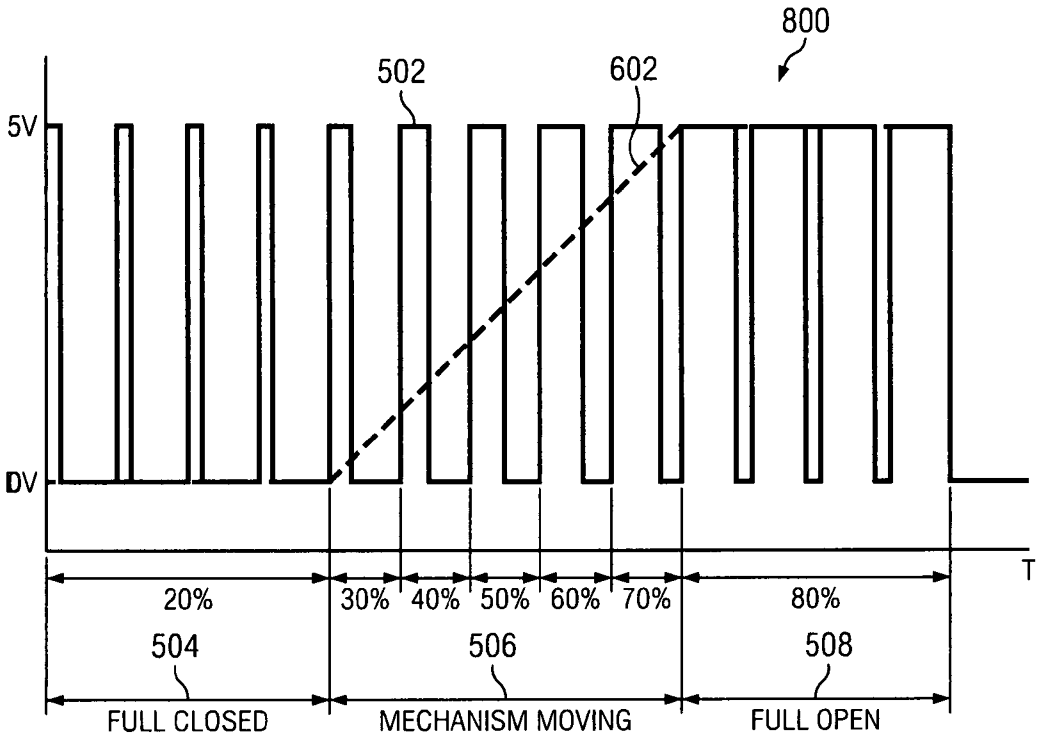
FIG. 8 is a graph showing the angle signal having an analog form of FIG. 6 with the angle signal having a pulsewidth modulation form of FIG. 5 overlaying the analog signal.

FIG. 8 is a graph showing the angle signal having an analog form of FIG. 6 with the angle signal having a pulsewidth modulation form of FIG. 5 overlaying the analog signal. As shown, an angle signal 502 having a PWM form (FIG. 5) may track an angle signal 602 (FIG. 6) having an analog form. Because the angle signal is digital in the PWM form case, the controller is less susceptible to error.

Figure 9:
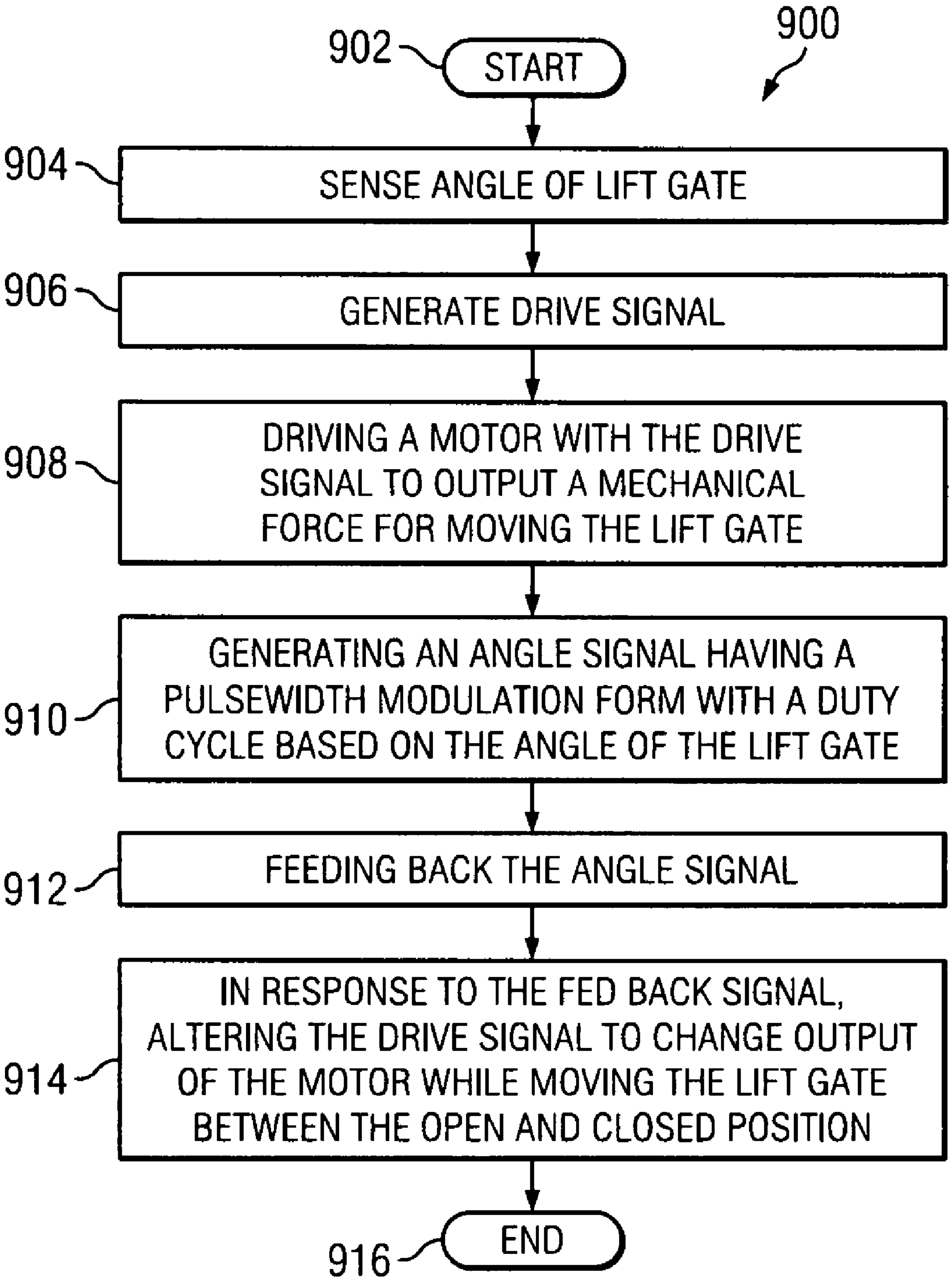
FIG. 9 is a flow chart of an exemplary process for determining whether an obstacle is obstructing movement of the rotational closure system.

FIG. 9 is a flow chart of an exemplary process for determining whether an obstacle is obstructing movement of the lift gate. The control process starts at step 102. At step 904, an angle of the lift gate is sensed when moving between an open and closed position. At step 906, a controller may generate a drive signal for driving a motor to move the lift gate. At step 908, the motor is driven with the drive signal to output a mechanical force for moving the lift gate. An angle signal having a pulsewidth modulation form with a duty cycle based on the angle of the lift gate may be generated at step 910. The angle signal may be fed back to a controller at step 912. In response to the feedback angle signal, the drive signal may be altered to change output of the motor while the motor is moving the lift gate between the open and closed position at step 914. The controller may utilize a position and/or speed control algorithm as understood in the art. Altering the drive signal may include (i) increasing or decreasing the value of the drive signal to increase or decrease the speed of the lift gate, (ii) reversing the drive signal to change direction of the lift gate, or (iii) maintaining the drive signal at a fixed value to stop or release the lift gate to be in a manual mode. The process ends at step 916.

Figure 10A:
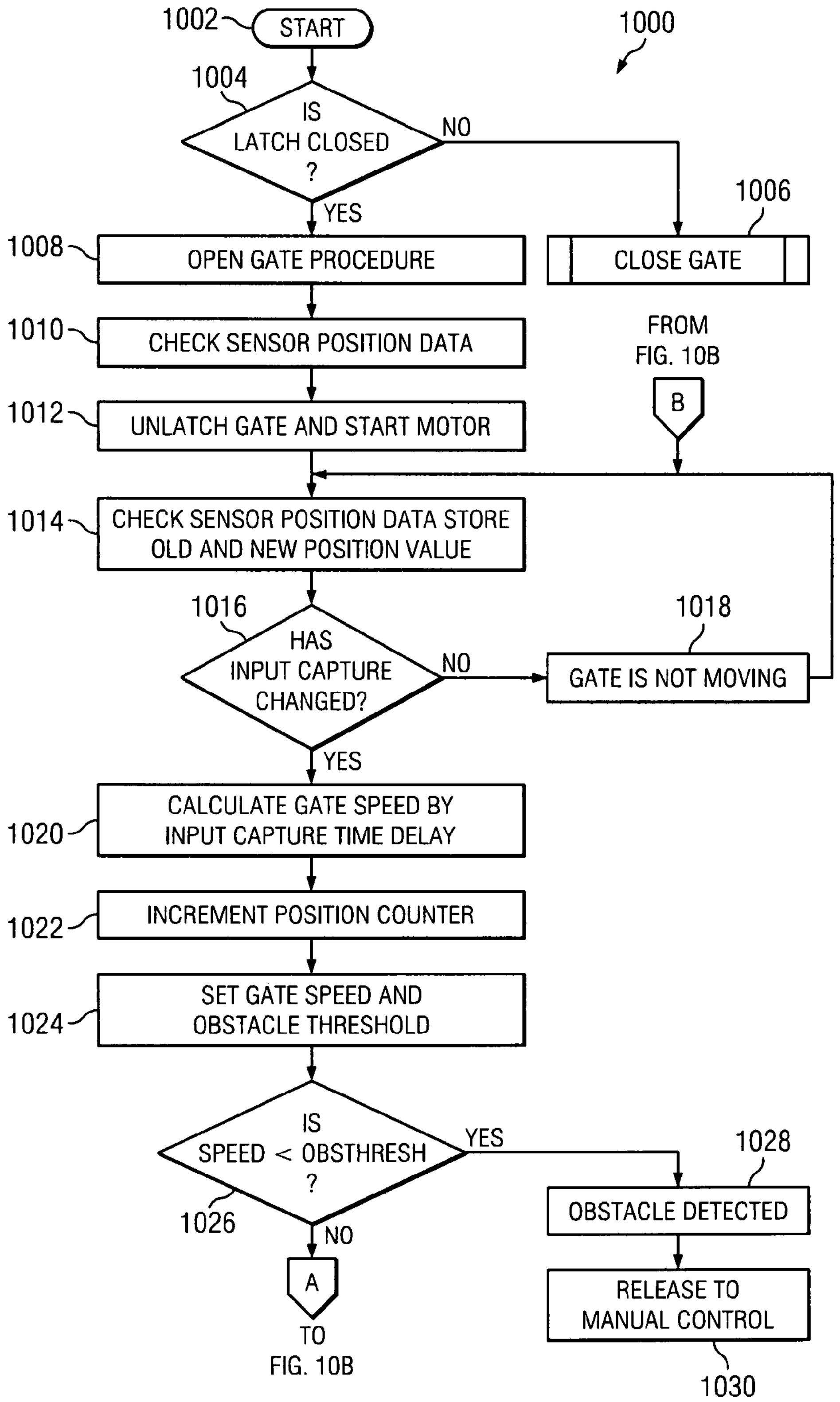
FIGS. 10A and 10B (collectively FIG. 10) are flow charts of an exemplary process for controlling opening of the rotational closure system to the gate.
Figure 10B:
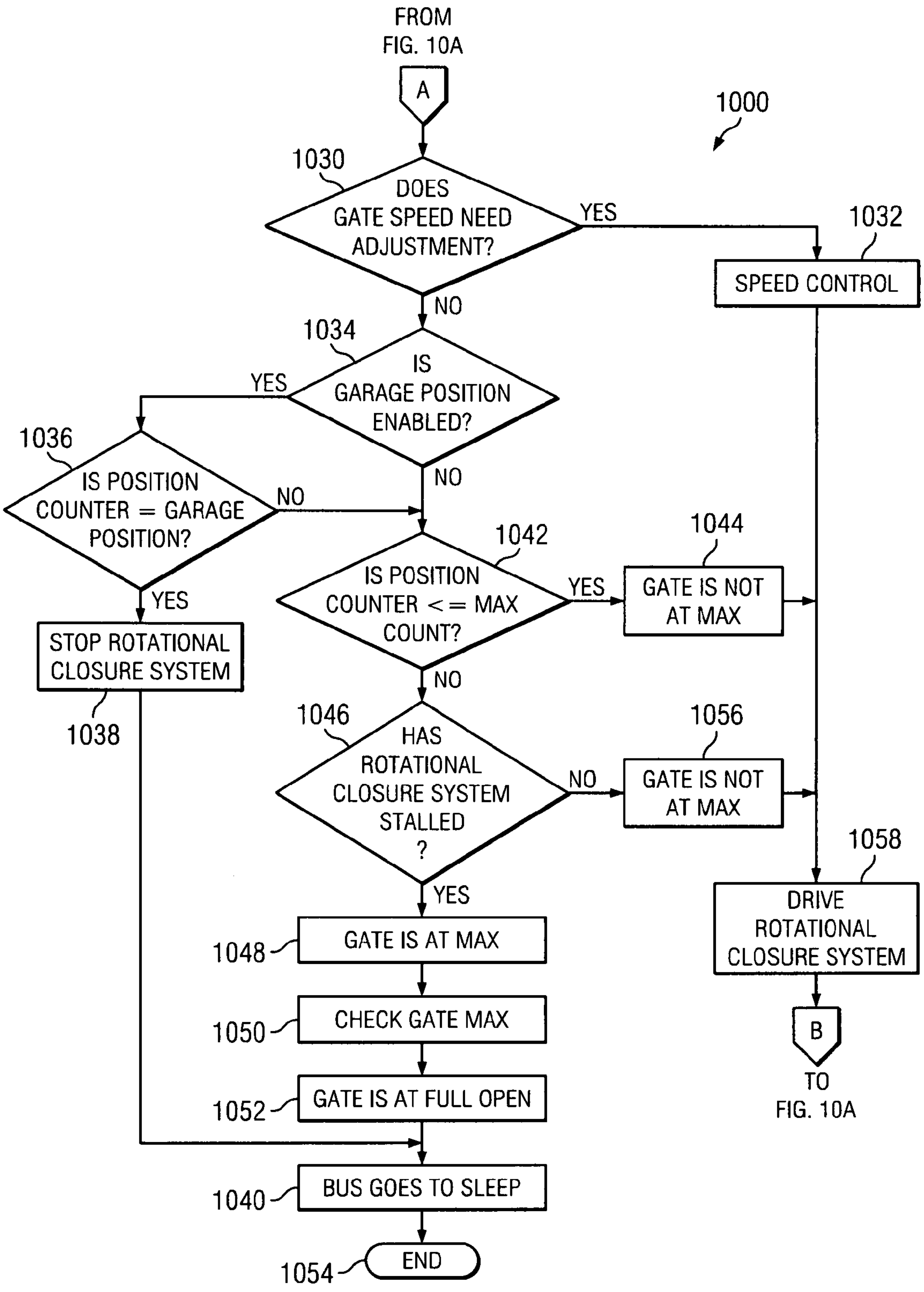

FIG. 10 is a flow chart of an exemplary process 1000 for controlling the lift gate to move the gate into an open position. The process 1000 starts at step 1002. At step 1004, a determination is made as to whether a latch for maintaining the lift gate is closed. If the latch is not closed, then a processor executing software for the process 1000 runs a procedure to close the lift gate at step 1006. If it was determined at step 1004 that the latch is closed, then at step 1008, the processor begins an open lift gate procedure. Because the principles of the present invention may be applied to any rotational closure system, the process 1000 for controlling the lift gate may be the same or similar when used to control other rotational closure systems.

At step 1010, the processor checks position data of a sensor. In accordance with the principles of the present invention, the sensor data provides absolute position information of the lift gate. For example, the position data may include angle information in accordance with the embodiment shown in FIG. 3 and be in a pulsewidth modulation form. At step 1012, the lift gate is unlatched and a motor for moving the lift gate is started. The sensor position data is checked, old position data is stored, and new position data is received. At step 1016, a determination is made as to whether the sensor position data has changed from a last position to a new position. If not, then at step 1018, it is determined that the gate is not moving and the process returns to step 1014 to check the sensor position data again. In the event that the lift gate continues not to move, a timeout procedure may be initiated, whereby the process may enter a manual mode. Other procedures may additionally and/or alternatively be executed in response to the lift gate not moving.

If at step 1016 it is determined that the sensor position data has changed, then at step 1020 a gate speed is calculated by using an input capture time delay between the new position and the old position (e.g., two milli-inches per milli-second). At step 1022, a position counter is incremented to maintain absolute position knowledge of the lift gate. At step 1024, gate speed and obstacle thresholds are set. If at step 1026 it is determined that the gate speed is less than the obstacle threshold, then at step 1028, it is determined that an obstacle is impeding movement of the lift gate. At step 1030, the process releases the lift gate to be manually controlled. In releasing the lift gate to be in manual control, the process may stop the lift gate from further opening so that the obstacle is not crushed or damaged. If at step 1026 it is determined that the speed of the lift gate is greater than or equal to the obstacle threshold, then a determination is made at step 1030 as to whether the lift gate speed needs adjustment. This decision is based on the actual speed of the lift gate to maintain a constant speed of the lift gate while opening. At step 1032, speed control is performed to increase or decrease the speed of the lift gate. If the lift gate speed does not need adjustment, then at step 1034, a determination is made as to whether a garage position is enabled. The garage position means the lift gate is to be raised only to a certain height to avoid the lift gate from hitting a ceiling within a garage. If at step 1034 it is determined that a garage position is enabled, then a determination is made at step 1036 as to whether the position counter is equal to the garage position. If so, then at step 1038, the motor moving the lift gate is stopped. At step 1040, a bus for driving the motor goes to sleep to reduce energy consumption.

If at either steps 1034 or 1036 either determination results in the negative, then at step 1042, a determination is made as to whether the position counter is less than or equal to a maximum count. If it is determined at step 1042 that the position counter is less than or equal to a maximum count, then a determination is made that the lift gate is not at a maximum at step 1044. If it is determined at step 1042 that the position counter is greater than the maximum count, a determination is made at step 1046 as to whether the drive mechanism or motor has stalled. If it is determined that the motor has stalled, then at step 1048, a determination is made that the lift gate is at a maximum position. At step 1050, a check of the gate maximum is made and it is determined at step 1052 that the lift gate is at a full open position. The process continues at step 1040 to put the bus to sleep to save energy. The process ends at step 1054 after the system bus is put to sleep after either the motor has stalled as determined at step 1046 or the position of the lift gate has been determined to be in a garage position at step 1036 and the motor stopped at step 1038.

If, however, at step 1046 it is determined that the motor has not stalled, then it is determined at step 1056 that the lift gate is not at a maximum. At step 1058, the processor executing the software for the process 1000 continues to drive the motor at step 1058. The motor is also driven in response to a determination being made at step 1030 that the lift gate needs speed adjustment and the speed control is performed at step 1032. After the motor is driven by an updated drive signal being applied to the motor at step 1058, the process continues at step 1014 where the sensor position data is checked, the old sensor data position is stored, and a new sensor position data value is obtained. The process continues until it is determined that the speed of the lift gate is such that an obstacle is detected, the lift gate reaches a garage position (if a garage position is set), or the lift gate reaches a maximum open position.

Figure 11A:
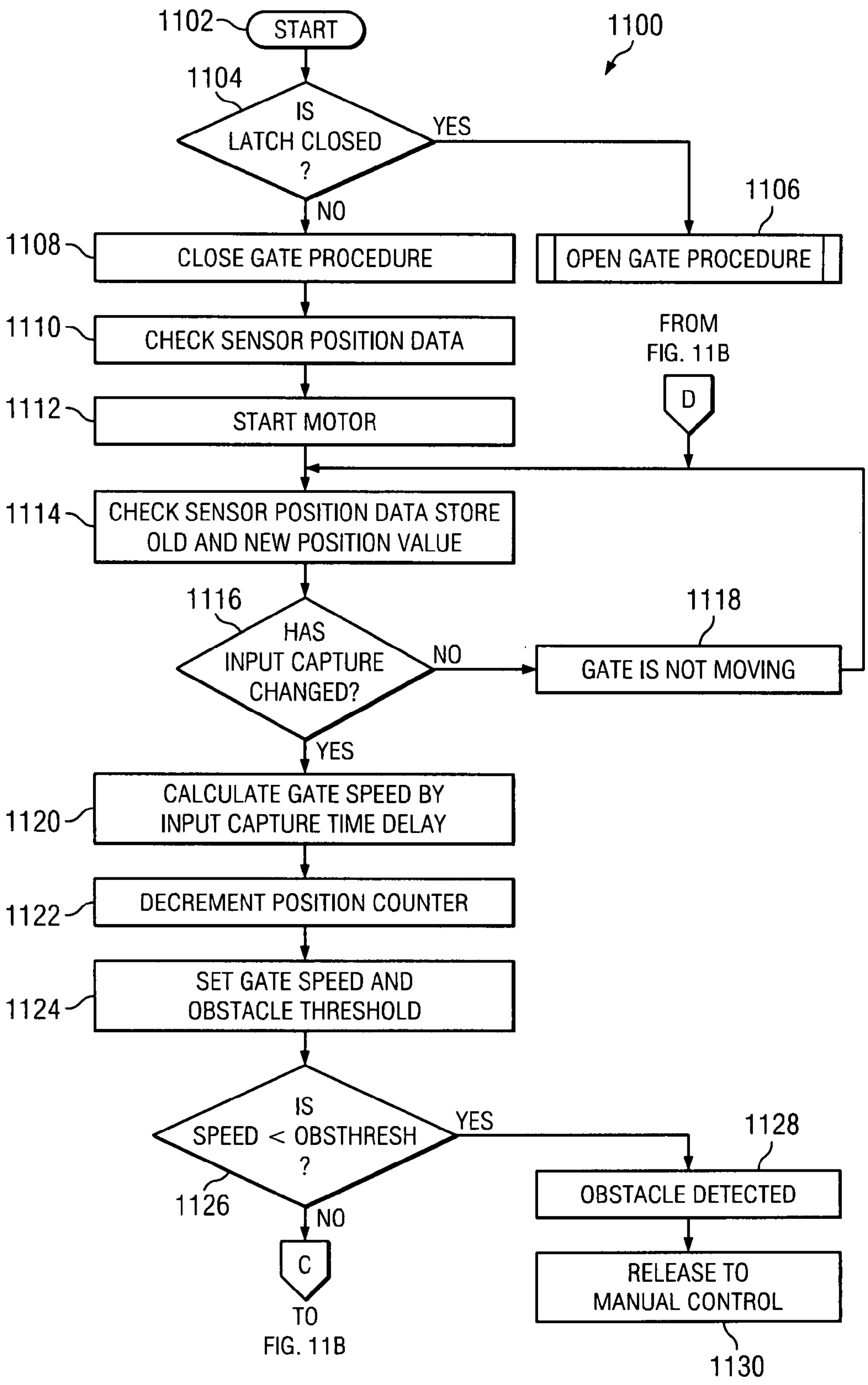
FIGS. 11A and 11B (collectively FIG. 11) are flow charts of an exemplary process for controlling closing of the rotational closure system.
Figure 11B:
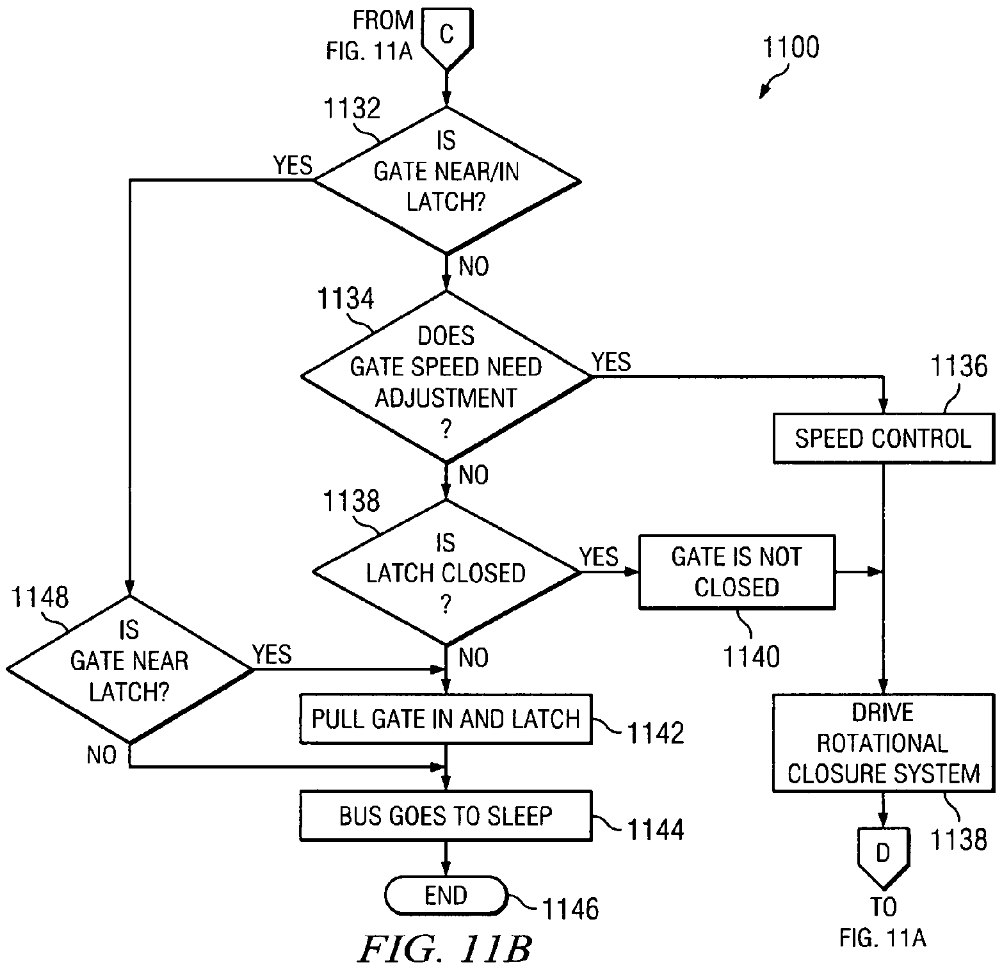

FIG. 11 is a flow chart of an exemplary process for controlling the lift gate starting in an open position. The gate position close process 1100 starts at step 1102. At step 1104, a determination is made as to whether a latch for maintaining the lift gate in a closed position is closed. If it is determined that the latch is closed, then at step 1106, an open gate procedure is performed. If it is determined that the latch is not closed at step 1104, then the process continues at step 1108 to start a close lift gate procedure.

At step 1110, sensor position data is checked and the motor is started at step 1112. At step 1114, the process 1100 checks sensor position data, stores old sensor position data, and obtains new position sensor data. At step 1116, a determination is made as to whether the new sensor position data has changed from the last stored sensor position data. If the data has not changed, then it is determined at step 1118 that the lift gate is not moving. The process continues back at step 1114, where the process may default into a manual mode or otherwise.

If at step 1116 it is determined that the lift gate sensor position data has changed, then at step 1120, lift gate speed is calculated by the distance the lift gate has moved over the time between sensing constructive positions of the lift gate. At step 1122, a position counter is decremented to maintain knowledge of absolute position of the lift gate. At step 1124, lift gate speed and optical thresholds are set.

At step 1126, a determination is made as to whether the lift gate speed is less than the obstacle threshold. If the lift gate speed is less than the obstacle threshold, then at step 1128, an obstacle is detected to be obstructing movement of the lift gate. The lift gate may be released to a manual control at step 1130, and a motor moving the lift gate may be stopped or reversed to avoid damage to the obstacle, injury to a person, or damage to the lift gate or its drive system.

If it is determined at step 1126 that the speed of the lift gate is not less than the obstacle threshold, then at step 1132, a determination is made as to whether the lift gate is near or in a latch used to secure the lift gate in a closed position. If the lift gate is not near or in the latch, then a determination is made at step 1134 as to whether the lift gate speed needs adjustment. If so, then at step 1136, speed control is performed to adjust the speed of the lift gate to be faster or slower. The process continues at step 1138, where the motor driving the lift gate is commanded by a drive signal. The process continues at step 1114.

If at step 1134 it is determined that the lift gate speed does not need adjustment, then at step 1138, a determination is made as to whether the latch is not closed. If it is determined that the latch is not closed, then it is determined at step 1140 that the gate is not in a closed position and a drive signal is sent to the motor to continue driving the lift gate at step 1138. If it is determined at step 1138 that the latch is closed then at step 1142, the lift gate is pulled in and latched at step 1142. The process 1100 continues at step 1144, where the bus for driving the motor is put to sleep to save energy and avoid further movement of the lift gate or latch. The process ends at step 1146.

If at step 1132 it is determined that the lift gate is near or in the latch, then at step 1148, a determination is made as to whether the lift gate is near the latch. If at step 1148 it is determined that the lift gate is near the latch, then at step 1142, the lift gate is pulled in and latched at step 1142. However, if it is determined at step 1148 that the lift gate is not near the latch, then the bus is put to sleep at step 1144. When the bus is put to sleep when the lift gate is still open, the controller may default to a manual mode. When the bus goes to sleep, the controller may be in a "low power" mode, where the controller relinquishes control of the gate until someone activates it again. It should be understood that alternative embodiments may be utilized to control the rotational closure system in both control and manual modes.

The principles of the present invention provide for a direct measurement system that uses an angle sensor that generates an angle signal having pulsewidth modulation with a duty cycle corresponding to the angle of a lift gate for providing feedback signaling of an absolute position of the lift gate. One embodiment utilizes a hydraulic pump mounted on the lift gate. A controller may be mounted to the lift gate and the angle sensor mounted to a circuit board of the controller to receive feedback of the position of the lift gate from the angle sensor to control speed and determine whether an obstacle is obstructing movement of the lift gate. It should be understood that other embodiments are contemplated that perform the same or similar function using the same or equivalent configuration as described above.

Figure 12A:
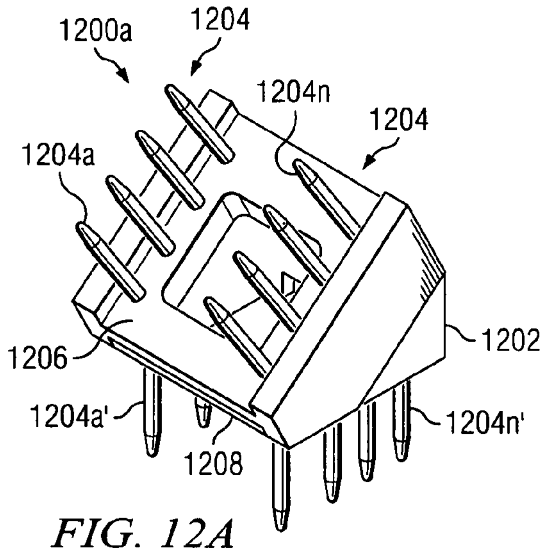
FIGS. 12A, 12B, and 12C are illustrations of exemplary headers for mounting an angle sensor to a printed circuit board of a control module for controlling a rotational closure system.

FIG. 12A is an illustration of an exemplary header 1200*a* for mounting an angle sensor to a printed circuit board of a control module for controlling a rotational closure system. The header 1200*a* includes a header body 1202, generally formed of nonconductive material, and terminals pins 1204. The header body 1202 includes a top side 1206 and a bottom side 1208. The top side 1206 and the bottom side 1208 may be configured such that a non-zero angle is formed therebetween. The terminal pins 1204 may include upper terminal pins 1204*a*-1204*n* and lower terminal pins 1204*a*'-1204*n*'. The terminal pins 1204 may pass through the header body 1202 and be bent such that the lower terminal pins 1204*a*'-1204*n*' are substantially perpendicular to the bottom side 1208 of the header body 1202. Similarly, the upper terminal pins 1204*a*-1204*n* may extend substantially perpendicular from the top side 1206 of the header body 1202. In another embodiment, the terminal pins 1204 may be formed of separate terminal pins, such that the upper terminal pins 1204*a*-1204*n* and lower terminal pins 1204*a*'-1204*n*' are respectively connected via a conductive material within the header body 1202. It should be understood that other configurations of the header 1200*a* may be utilized in accordance with the principles of the present invention. For example, rather than having pins extended from the top side 1206 of the header body 1202, sockets that receive pins may be utilized in accordance with the principles in the present invention.

Figure 12B:
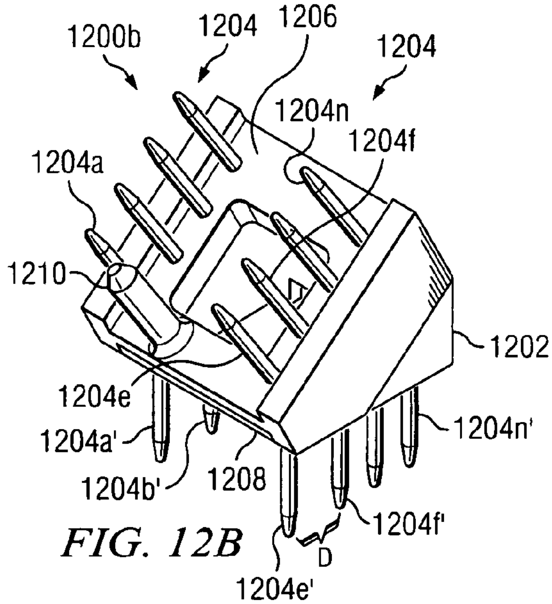

FIG. 12B is an illustration of another exemplary header 1200*b* for mounting an angle sensor to a printed circuit board of a control module for controlling a rotational closure system. The header 1200*b* includes a protrusion 1210, such as a boss, that may be used for keying an angle sensor mounted to the header 1200*b*. The protrusion 1210 is shown to be a column, but any configuration of a protrusion may be utilized. It should be understood that a detent, indentation, cut-out, or other identifier (e.g., marking or pin extending from the top of the header 1200*b*) disposed at or near an end of the header 1200*b* may be utilized to provide a key for a user to know how the header 1200*b* should be mounted to a printed circuit board. In one embodiment, pin 1204*b*' may also include a spacing D (not shown) to match the spacing D between pins 1204*e*' and 1204*f*'. In addition or alternative to protrusion 1210, a pin spacing D may be formed between pins 1204*e*' and 1204*f*'. Pins 1204*e* and 1204*f* may be spaced the same as the other pins 1204 or have a matching spacing D as for pins 1204*e*' and 1204*f*'. The spacing D may be configured such that it is a different spacing than spacings between a majority of other pins. That is, most other pins have a regular spacing and the spacing or alignment of a keying pin is different from that regular spacing.

Figure 12C:
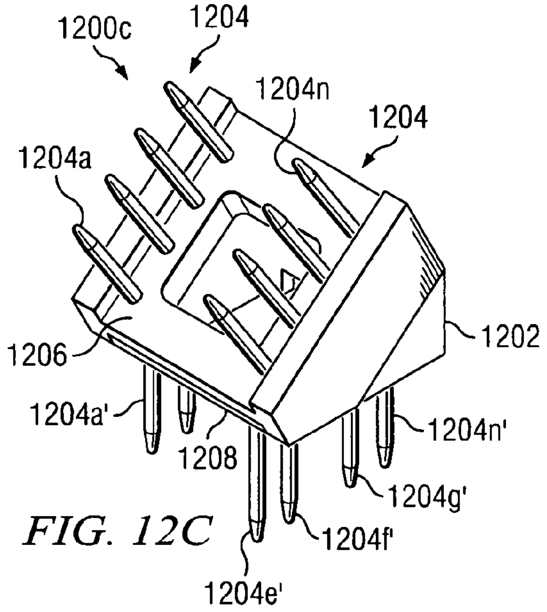

FIG. 12C is an illustration of another exemplary header 1200*c* for mounting an angle sensor to a printed circuit board of a control module for controlling a rotational closure system. The header 1200*c* may include a keying pin 1204*f*' that extends from the bottom of the header. The keying pin 1204*f*' may have a different spacing from one pin 1204*g*' than spacings between a majority of other pins, thereby providing a visual distinction for a user of the header 1200*c*. The use of a keying feature, such as the protrusion 1210 (FIG. 12B) or keying pin 1204*g*' (FIG. 12Q) should substantially eliminate the potential of incorrect header insertion or usage.

Figure 13:
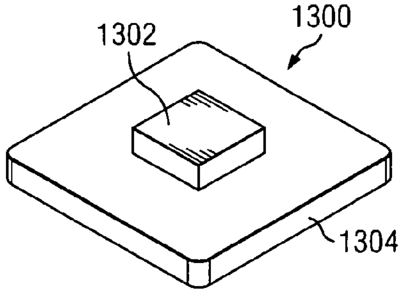
FIG. 13 is an illustration of an exemplary angle sensor unit for use in controlling a rotational closure system.

FIG. 13 is an illustration of an exemplary angle sensor unit 1300 for use in controlling a rotational closure system. The angle sensor unit 1300 may include an angle sensor 1302 and angle sensor printed circuit board (PCB) 1304 to which the angle sensor 1302 is connected. In one embodiment, the angle sensor 1302 is a MEMSIC accelerometer having part number MKD2040. The accelerometer may be programmed or otherwise configured to have an initial offset angle, which may be set and stored post production of the accelerometer. Other angle sensors as understood in the art may be utilized in accordance with the principles of the present invention. The angle sensor PCB 1304 is used to electrically connect the angle sensor to other devices, such as the header 1200*a* (FIG. 12A).

Figure 14A:
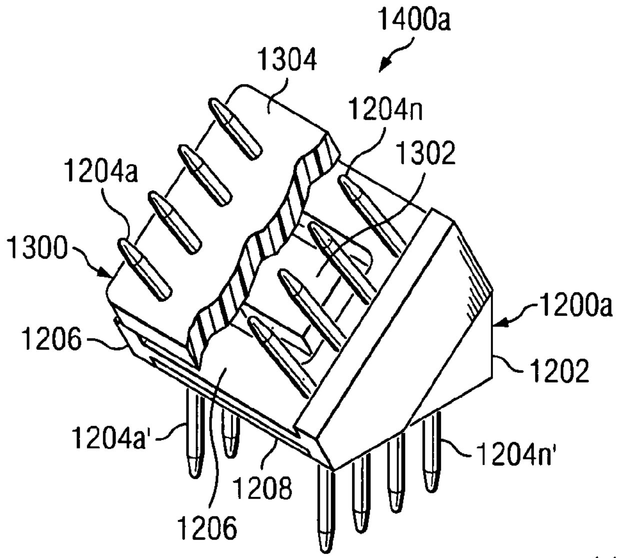
FIGS. 14A and 14B are illustrations of exemplary embodiments of angle sensor assemblies for use in controlling a rotational closure system of a vehicle.
Figure 14B:
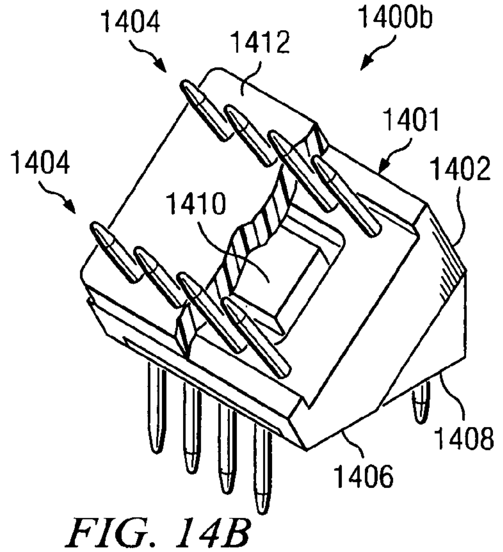

FIGS. 14A and 14B are illustrations of exemplary embodiments of angle sensor assemblies 1400*a* and 1400*b*, respectively, for use in controlling a rotational closure system of a vehicle. As shown in FIG. 14A, the angle sensor assembly 1400*a* includes angle sensor unit 1300 (FIG. 13) connected to header 1200*a* (FIG. 12A) via the upper pins 1204*a*-1204*n* being connected to the angle sensor PCB 1304. This connection enables the angle sensor 1302 to communicate with an external device, such as a controller for controlling rotation of a rotational closure system. In one embodiment, the controller is mounted to a printed circuit board to which the header is mounted (see FIG. 2A). Alternatively, the controller is mounted to another printed circuit board located within the vehicle (see FIG. 1A). FIG. 14B is an alternative embodiment of a header 1401 including a header body 1402 and terminal pins 1404. In this embodiment, the terminal pins 1404 are rotated with respect to the header 1200*a* (FIG. 14A) to run along a front edge 1406 and rear edge 1408 of the header body 1402. As shown, an angle sensor 1410 may be connected to the terminal pins 1404 via an angle sensor PCB 1412.

Figure 15A:
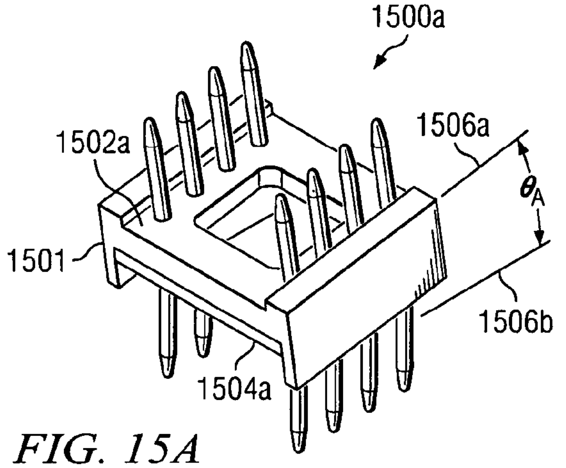
FIGS. 15A and 15B are exemplary embodiments of a header having different angles formed between a top side and a bottom side of a header body.
Figure 15B:
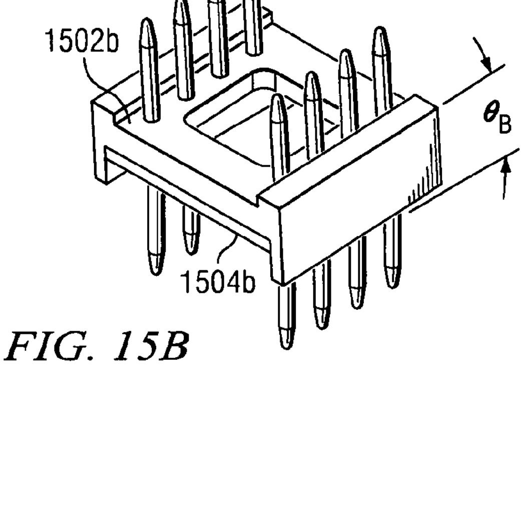

FIGS. 15A and 15B are exemplary embodiments of a header 1500*a* having different angles formed between a top side 1502*a* and a bottom side 1504*a* of a header body 1501. As shown in FIG. 15A, an angle $\theta_A$ is formed between an upper side 1502*a* and a lower side 1504*a*. It should be understood that the top side 1502*a* and lower side 1504*a* may be related to any features on the header body 1501 that cause an angle sensor (not shown) to have a certain offset angle relative to a plane of a printed circuit board, for example, to which the header 1500*a* is mounted. In this embodiment, the angle $\theta_A$ is 15 degrees. As shown, the angle $\theta_A$ is shown between two lines 1506*a* and 1506*b*. Again, it should be understood that any surfaces or points of the header 1500*a* that establish or relate to the angle at which an angle sensor is positioned with respect to a printed circuit board (see FIG. 16A) to which the header may be connected. As shown in FIG. 15B, the header 1500*b* has an angle $\theta_B$ of 5 degrees. These headers 1500*a* and 1500*b* having different angles are exemplary in that they may be used in accordance with the principles of the present invention for establishing an angle at which the angle sensor may be positioned in a resting state (e.g., when a lift gate is closed). By using angled headers, a common control module may be used for different rotational closure systems because the different angled headers can be used with the controllers to offset the angle sensors to be rotationally oriented to start in the same angular orientation, such as 45 degrees relative to a longitudinal axis of a vehicle (i.e., longitudinally along a vehicle).

Figure 16A:
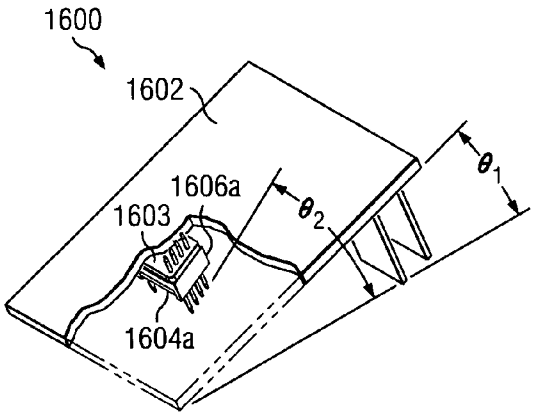
FIGS. 16A and 16B are illustrations of exemplary embodiments of a printed circuit board at different angular orientations utilizing different headers to control a rotational closure system.
Figure 16B:
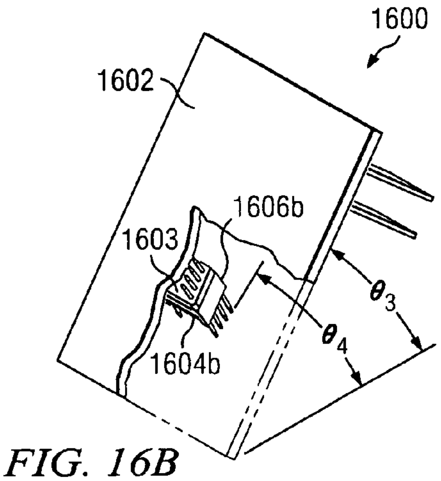

The principles of the present invention further provide for a process of manufacturing a header configured to mount an electronic device to a printed circuit board. The process includes forming a header body having a bottom and top, where the bottom extends along a first plane and the top extending along a second plane. The first and second planes may be configured to have a relative, non-zero degree angle formed therebetween. A first set of pins may be extended from the bottom of the header body for connecting the header body to a printed circuit board. In manufacturing the header, conventional injection molding processes or other conventional processes for forming headers may be utilized. A second set of pins may be extended from the top of the header body and be configured to connect to an electronic device, such as a printed circuit board. The first and second sets of pins are configured substantially perpendicular from the header body FIGS. 16A and 16B are illustrations of exemplary embodiments of a control module 1600 having a printed circuit board 1602 utilizing different header units 1604*a* for use in controlling a rotational closure system. As shown in FIG. 16A, the control module 1600 includes a printed circuit board 1602 to be configured within or on a rotational closure system at an angle $\theta_1$ of 30 degrees. In one embodiment, the rotational closure system may include a control module that is programmed to have an angle of 45 degrees as an initial starting angle. Because the printed circuit board 1602 is angularly positioned with $\theta_1$ at 30 degrees, another 15 degrees offset is used to orient an angle sensor. As shown, angle sensor assembly 1604*a* uses a header 1606*a* having an angle orientation of 15 degrees, such as the header 1500*a* shown in FIG. 15A. By using the 15 degree header 1606*a*, an angle $\theta_2$, which represents the angle at which an angle sensor 1603 is positioned when the rotational closure system is in a closed state, is equal to 45 degrees. In an alternative embodiment shown in FIG. 16B, the printed circuit board 1602 may be configured within a rotational closure system with an angle $\theta_3$ at 50 degrees. In order to orient the angle sensor 1603 at 45 degrees such that the control module receives an angle signal at a known or predetermined orientation the same as other vehicles to reduce cost of configuring control modules, an angle sensor assembly for 1604B uses a header 1606B having a negative 5 degree angle between the top and bottom sides of the header 1604B so that an angle $\theta_4$ is 45 degrees. Again, the control module for different vehicles that is used to control the rotational closure system may be the same or common and a variable component, such as a header, may be used to orient an angle sensor for feedback in controlling the rotational closure system.

Figure 17:
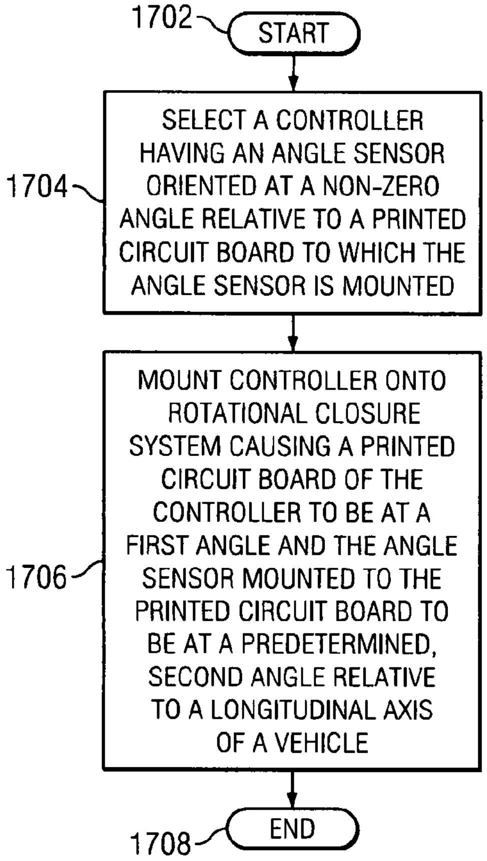
FIG. 17 is a flow diagram of an exemplary process for producing a rotational closure system with a controller in accordance with the principles of the present invention.

FIG. 17 is a flow diagram of an exemplary process 1700 for manufacturing a rotational closure system with a controller in accordance with the principles of the present invention. The process 1700 starts at step 1702. At step 1704, a controller having an angle sensor angularly oriented at a non-zero angle relative to a printed circuit board with which the angle sensor communicates may be selected. In selecting the controller, the controller may be selected from among controllers having respective angle sensors angularly oriented at other, non-zero angles relative to respective printed circuit boards. For example, there may be a number of controllers that are configured with angle sensors being at non-zero angles, such as 10, 15, 25, 30, 35, and 45 degrees, relative to printed circuit boards. Alternatively, selecting the controller may include ordering controllers from a supplier with angle sensor assemblies with headers having specific angles to be used with a particular rotational closure system. At step 1706, the controller is mounted onto a rotational closure system causing the printed circuit board of the controller to be at a first angle and the angle sensor mounted to the printed circuit board to be at a second angle relative to horizontal. In terms of the angle sensor being "mounted" to the printed circuit board, the angle sensor may be connected to a smaller printed circuit board, which is connected to a header (e.g., FIGS. 16A and 16B). The term "mounted," "connected," or other connection term as used in this application is not intended to be limited to a device (e.g., angle sensor) being directly connected to another device (e.g., PCB) without an intermediary device, such as a header. In one embodiment, the controller is mounted at an angle such that the second angle is approximately 45 degrees. By configuring the controllers on different rotational closure systems with angle sensors at the same angle (e.g., 45 degrees relative to a longitudinal axis of a vehicle), a common controller may be utilized in different vehicles.

Figure 18:
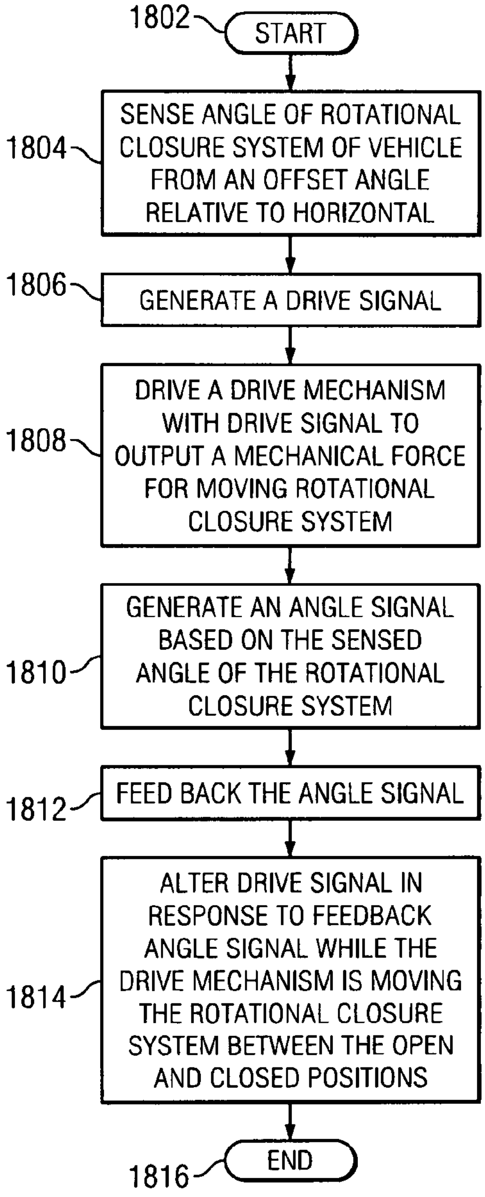
FIG. 18 is a flow diagram of an exemplary process for controlling a rotational closure system.

FIG. 18 is a flow diagram of an exemplary process 1800 for controlling a rotational closure system. The process 1800 starts at step 1802. At step 1804, an angle of a rotational closure system of a vehicle is sensed from an offset angle relative to horizontal. At step 1806, a drive signal is generated. The drive signal is used to drive a drive mechanism to output a mechanical force for moving the rotational closure system at step 1808. In one embodiment, the drive mechanism is a motor. The motor may be hydraulic, pneumatic, electromechanical, or otherwise. At step 1810, an angle signal is generated based on the sensed angle of the rotational closure system. The angle signal is fed back at step 1812. The feed back may be a closed loop feedback system or open look feedback system. At step 1814, a drive signal may be altered in response to the feedback angle signal while the drive mechanism is moving the rotational closure system between the open and closed positions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A header configured to mount an electronic device to a printed circuit board, said header comprising:

a header body having a bottom and top, the bottom extending along a first plane and the top extending along a second plane, the first and second planes having a relative, non-zero degree angle formed therebetween;

a keying mechanism disposed on the header body; and a first set of pins extending from the bottom of said header body for connecting said header body to a printed circuit board.

2. The header according to claim 1, further comprising a second set of pins extending from the top of said header body and configured to connect to an electronic device.

3. The header according to claim 2, wherein the electronic device includes a second printed circuit board connected to an angle sensor.

4. The header according to claim 2, wherein said first and second sets of pins extend substantially perpendicular from said header body.

5. The header according to claim 1, wherein the keying mechanism includes a protrusion extending from the top of the header body.

6. The header according to claim 1, wherein the first set of pins extending from the bottom of said header body includes a keying pin.

7. The header according to claim 6, wherein the keying pin has a spacing different from spacings between a majority of other pins.

8. A method of manufacturing a header configured to mount an electronic device to a printed circuit board, said method comprising:

forming a header body having a bottom and top, the bottom extending along a first plane and the top extending along a second plane, the first and second planes having a relative, non-zero degree angle formed therebetween;

forming a keying mechanism extending outwardly from the header body; and extending a first set of pins from the bottom of said header body for connecting the header body to a printed circuit board.

9. The method according to claim 8, further comprising a extending a second set of pins from the top of the header body and configured to connect to an electronic device.

10. The method according to claim 9, wherein extending the second set of pins includes extending the second set of pins to connect to the electronic device that includes a second printed circuit board connected to an angle sensor.

11. The method according to claim 8, wherein extending the first and second sets of pins causes the first and second pins to be substantially perpendicular from the header body.

12. The method according to claim 8, wherein forming a keying mechanism includes forming a protrusion extending from the top of the header body.

13. The method according to claim 8, wherein extending the first set of pins from the bottom of the header body includes extending a keying pin.

14. The method according to claim 13, wherein extending the keying pin includes extending the keying pin at a different spacing than spacings between a majority of other pins.

15. A control module for controlling a rotational closure system of a vehicle, said control module comprising:

a printed circuit board;

an electronic circuit disposed on said printed circuit board, said electronic circuit configured to control a rotational closure system of a vehicle;

a header connected to said printed circuit board, said header having a top side and a bottom side having a relative, non-zero degree angle formed therebetween, said header further configured to form an electrical connection with said electronic circuit;

a keying mechanism disposed on the header; and an angle sensor positioned on the top side of said header and configured to communicate with said electronic circuit, said angle sensor generating an angle signal for said electronic circuit to use in positioning the rotational closure system.

16. The control circuit according to claim 15, wherein said printed circuit board is mounted to the rotational closure system at an angle relative to a longitudinal axis of a vehicle to cause the sum of the angle of the mounted printed circuit board and the non-zero degree angle of said header in relation to a surface of said printed circuit to which said header is mounted to form a predetermined angle.

17. The control circuit according to claim 16, wherein the predetermined angle is approximately 45 degrees.

18. The control circuit according to claim 15, wherein said electronic circuit uses pulsewidth modulation signals to control the rotational closure system.

19. A method of manufacturing a rotational closure system, said method comprising:

selecting a controller having an angle sensor oriented at a non-zero angle relative to a printed circuit board to which the angle sensor is mounted; and mounting the controller onto a rotational closure system, said mounting causing the printed circuit board to be at a first angle relative to a longitudinal axis of a vehicle and the angle sensor mounted to the printed circuit board to be at a predetermined, second angle relative to the longitudinal axis.

20. The method according to claim 19, wherein selecting includes determining an angle at which the printed circuit board of the controller is to be angularly oriented to the rotational closure system and providing a controller for installation that when installed will cause the second angle to be at a predetermined angle relative to a longitudinal axis of a vehicle.

21. The method according to claim 19, wherein mounting the controller causes the second angle to be at approximately 45 degrees.

22. A vehicle, comprising:

a vehicle body;

a rotational closure system rotatably coupled to said body;

a printed circuit board coupled to said rotational closure system and positioned at a first angle relative to a longitudinal axis of a vehicle;

an angle sensor mounted to said printed circuit board and positioned at a second angle relative to the longitudinal axis; and a controller in communication with said angle sensor and configured to receive angle signals from said angle sensor to control operation of said rotational closure system.

23. The vehicle according to claim 22, wherein said controller is coupled to the printed circuit board and includes a processor configured to receive angle signals from said angle sensor and adjust a speed of said rotational closure system based on an angle signal generated by said angle sensor.

24. The vehicle according to claim 22, wherein the second angle is approximately 45 degrees.

25. The vehicle according to claim 22, wherein the first angle is less than approximately 45 degrees.

26. The vehicle according to claim 22, wherein said controller further includes a header connected to said printed circuit board for mounting said angle sensor to said printed circuit board.

27. The vehicle according to claim 22, wherein said controller is remotely positioned from said printed circuit board.

28. The vehicle according to claim 22, wherein said controller is coupled to said rotational closure system.

29. A method for controlling a rotational closure system of a vehicle, said method comprising:

sensing an angle of the rotational closure system of the vehicle, the angle being sensed from a predetermined offset angle relative to a longitudinal axis of a vehicle;

generating a drive signal;

driving a drive mechanism with the drive signal to output a mechanical force for moving the rotational closure system;

generating an angle signal based on the sensed angle of the rotational closure system;

feeding back the angle signal; and in response to the feedback angle signal, altering the drive signal while the drive mechanism is moving the rotational closure system between the open and closed positions.

30. The method according to claim 29, wherein sensing the angle is sensed relative to approximately a 45 degree angle.

31. The method according to claim 29, wherein generating an angle signal is performed using pulsewidth modulation.

32. The method according to claim 29, wherein sensing the angle is performed by an angle sensor mounted to a header connected to a printed circuit board, the header causing the angle sensor to have a non-zero angle offset between the angle sensor and printed circuit board.

* * * * *